United States Patent [19]

Inoue

[11] Patent Number: 4,932,220
[45] Date of Patent: Jun. 12, 1990

[54] AIR CONDITIONER SYSTEM WITH OPTIMUM HIGH PRESSURE CONTROL FUNCTION

[75] Inventor: Tsunetoshi Inoue, Fuji, Japan
[73] Assignee: Kabushiki Kaisha Toshiba, Kawasaki, Japan
[21] Appl. No.: 362,668
[22] Filed: Jun. 7, 1989
[30] Foreign Application Priority Data Sep. 30, 1988 [JP] Japan ................ 63-246473

[51] Int. Cl.$^5$ .............................. F25B 7/00
[52] U.S. Cl. ....................... 62/175; 62/226; 62/228.3
[58] Field of Search ............ 62/175, 228.3, 226; 236/1 EA; 417/5

[56] References Cited

U.S. PATENT DOCUMENTS

| | | | |
|---|---|---|---|
| 2,231,069 | 2/1941 | Harris | 417/5 X |
| 4,384,462 | 5/1983 | Overman et al. | 62/228.3 Y |
| 4,720,982 | 1/1988 | Shimizu et al. | 62/204 |
| 4,766,735 | 8/1988 | Gotou | 62/175 |

FOREIGN PATENT DOCUMENTS

| | | | |
|---|---|---|---|
| 0153334 | 7/1986 | Japan | 62/175 |
| 0225530 | 10/1986 | Japan | 62/228.3 |

Primary Examiner—William E. Wayner
Attorney, Agent, or Firm—Cushman, Darby & Cushman

[57] ABSTRACT

An outdoor unit has at least two compressors including at least one variable-capability compressor, and an outdoor heat exchanger coupled to the two compressors. A plurality of indoor units are connected to the outdoor unit to constitute a refrigeration cycle, and each indoor unit includes at least an indoor heat exchanger, and a section for outputting required capability data in accordance with an air-conditioning load of the indoor heat exchanger. A pressure sensor senses a higher-side pressure of the refrigeration cycle constituted by coupling the outdoor unit to the plurality of indoor units. A control section generates an operating command for designating the predetermined number of operation of the two compressors and a predetermined capability of the variable-capability compressor in accordance with required capability data from the plurality of indoor units, and generates a correction command to correct the number of operation of the two compressors and the capability of the variable-capability compressor in response to the detection output from the pressure sensor in order prevent an abnormal increase in higher-side pressure of the refrigeration cycle.

29 Claims, 5 Drawing Sheets

AIR CONDITIONER SYSTEM WITH OPTIMUM HIGH PRESSURE CONTROL FUNCTION

BACKGROUND OF THE INVENTION

1. Field of the Invention

This invention relates to an air conditioner system and, more particularly, to an air conditioner system including a plurality of variable-capability compressors.

2. Description of the Related Art

As a multi-type air conditioner system constituted by a heat pump type refrigeration cycle, an air conditioner system including a plurality of devices for the refrigeration cycle such as an outdoor unit having a plurality of variable-capability compressors, and a plurality of indoor units, for controlling the number of operating compressors and their operating frequency in accordance with a required capability of each indoor unit, is conventionally known.

In such an air conditioner system, the higher-side pressure of the refrigeration cycle is often increased to an abnormal level upon starting under an overload condition. Therefore, in this condition, the devices for the refrigeration cycle are adversely affected.

A high pressure switch operated at a predetermined pressure is provided in the refrigeration cycle, for interrupting the operation of the air conditioner system, thus protecting the devices against high pressures.

In order to minimize the number of instances of interruption of the operation of the air conditioner system, a so-called frequency-reduction release for reducing the operating frequency of the compressor is performed when the higher-side pressure reaches a preset value slightly lower than the point at which the high pressure switch is activated, in order to suppress any further increase in the higher-side pressure.

However, when an oil-equalizing operation between the compressors is performed upon starting of the system, or when a small number of indoor units begin operating, the higher-side pressure increases rapidly, with the result that the frequency-reduction release cannot respond an increase in the high-side pressure. As a result, the high pressure switch is operated, interrupting the starting operation of the air conditioner system.

The interruption because of the above-described reason is not necessarily preferable for a user. It is preferable for the user that the air conditioner system avoids interruption of the starting operation, and smoothly reaches a normal operation.

SUMMARY OF THE INVENTION

It is therefore an object of the present invention to provide a new and improved air conditioner system having an optimum high pressure control function for suppressing any abnormal increase in the higher-side pressure by it having a high pressure sensor, and which can prevent, as much as possible, interruption of the air conditioner system by means of operation of a high pressure switch, thus allowing a stable operation.

It is a further object of the present invention to provide an air conditioner system which can further effectively suppress an abnormal increase in higher-side pressure by it having a high pressure change rate detecting means in addition to a high pressure sensor, and can prevent, as much as possible, interruption of the air conditioner system by an operation of the high pressure switch, thus allowing a stable operation.

According to one aspect of the present invention, there is provided an air conditioner comprising:

an outdoor unit having at least two compressors including at least one variable-capability compressor to which is coupled an outdoor heat exchanger;

a plurality of indoor units coupled to the outdoor unit, to constitute a refrigeration cycle, each indoor unit having at least an indoor heat exchanger, and means for outputting required-capability data in accordance with an air-conditioning load of the indoor heat exchanger;

pressure sensing means for sensing a higher-side pressure of the refrigeration cycle; and control means for generating an operation command for designating a predetermined number of operation of the two compressors and a predetermined capability of the variable-capability compressor, in accordance with required-capability data from the plurality of indoor units, and generating in response to a detection output from the pressure sensing means, a correction command to correct the number of operation of the two compressors and the capability of the variable-capability compressor, in order to prevent an abnormal increase in the higher-side pressure of the refrigeration cycle.

More specifically, in the air conditioner having the above-described arrangement, the correction command includes a first command for reducing the capability (operating frequency) of the variable-capability compressor when the higher-side pressure of the refrigeration cycle exceeds a first preset value $P_1$, and a second command for interrupting the operation of one of the two compressors when the higher-side pressure is further increased to exceed a second preset value $P_0$.

According to another aspect of the present invention, there is provided an air conditioner comprising:

an outdoor unit having at least two compressors including at least one variable-capability compressor to which is coupled an outdoor heat exchanger;

a plurality of indoor units coupled to the outdoor unit, to constitute a refrigeration cycle, each indoor unit having at least an indoor heat exchanger, and means for outputting required-capability data in accordance with an air-conditioning load of the indoor heat exchanger;

pressure sensing means for sensing a higher-side pressure of the refrigeration cycle; and control means for generating an operation command for designating a predetermined number of operation of the two compressors and a predetermined capability of the variable-capability compressor, in accordance with required-capability data from the plurality of indoor units, and generating, in accordance with a higher-side pressure increasing rate based on a detection output from the pressure sensing means, a correction command to selectively correct the number of operation of the two compressors and the capability of the variable-capability compressor, in order to prevent an abnormal increase in the higher-side pressure of the refrigeration cycle.

In the above-mentioned arrangement, more specifically, the correction command includes a first command to reduce a operating frequency of the variable-capability compressor when the higher-side pressure of the refrigeration cycle exceeds a preset value, and a second command to interrupt an operation of one of the two compressors. Execution of the first or second command is selected in accordance with the rate of increase in higher-side pressure.

BRIEF DESCRIPTION OF THE DRAWINGS

These and other objects and features of the present invention can be understood through the following embodiments by reference to the accompanying drawings, in which.

DETAILED DESCRIPTION OF THE PREFERRED EMBODIMENTS

An embodiment of the present invention will be described hereinafter with reference to the accompanying drawings.

Figure 1:
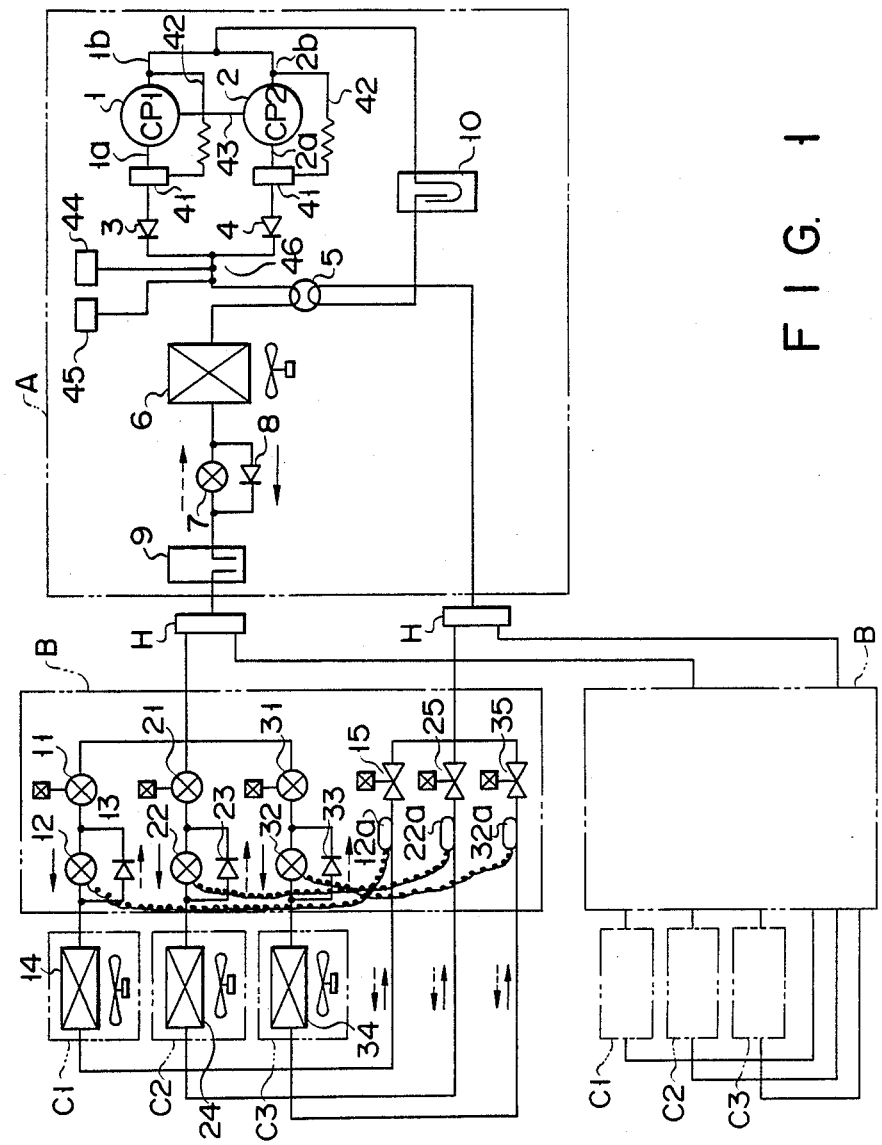
FIG. 1 is a view showing an arrangement of a refrigeration cycle according to a first embodiment of the present invention.

Referring to FIG. 1, reference symbol A denotes an outdoor unit; B, a branch unit; and $C_1$, $C_2$, and $C_3$ indoor units.

The outdoor unit A includes two variable-capability compressors 1 and 2. The compressors 1 and 2 are connected to outlet-side refrigerant pipes 1a and 2a through check valves 3 and 4 in parallel to each other, and directly coupled to inlet-side refrigerant pipes 1b and 2b, respectively.

The compressors 1 and 2 sequentially communicate with a parallel section including a 4-way valve 5, an outdoor heat exchanger 6, a heating expansion valve 7, and a cooling cycle formation check valve 8, a parallel section including a liquid tank 9, a header H, electrically-powered refrigerant flow control valves (pulse motor valves) 11, 21, and 31, cooling expansion valves 12, 22, and 32, and heating cycle formation check valves 13, 23, and 33, indoor heat exchangers 14, 24, and 34, gas-side opening/closing valves (opening/closing solenoid valves) 15, 25, and 35, another header H, an accumulator 10, and the like, thus constituting a heat pump type refrigeration cycle.

Note that the cooling expansion valves 12, 22, and 32 respectively have heat-sensitive cylinders 12a, 22a, and 32a. The heat-sensitive cylinders are mounted in gas-side refrigerant pipes of the indoor heat exchangers 14, 24, and 34, respectively.

More specifically, when a cooling operation is performed, a refrigerant flows in the direction indicated by solid arrows shown in FIG. 1 to form a cooling cycle. The outdoor heat exchanger 6 serves as a condenser, and the indoor heat exchangers 14, 24, and 34 serve as evaporators.

When a heating operation is performed, the refrigerant flows in the direction indicated by broken arrows shown in FIG. 1 in response to a switching operation of the 4-way valve 5 to form a heating cycle. The indoor heat exchangers 14, 24, and 34 serve as condensers, and the outdoor heat exchanger 6 serves as an evaporator.

The branch unit B extends between liquid- and gas-side refrigerant pipes communicating with the indoor units $C_1$, $C_2$, and $C_3$. The branch unit B includes the refrigerant flow control valves 11, 21, and 31, the cooling expansion valves 12, 22, and 32, the heating cycle formation check valves 13, 23, and 33, and the gas-side opening/closing valves 15, 25, and 35.

Note that an oil separator 41 is disposed in the outlet-side refrigerant pipe (high pressure side) 1a of the compressor 1, and an oil bypass pipe 42 extends from the oil separator 41 to the inlet-side refrigerant pipe (low-pressure side) 1b of the compressor 1. Similarly, an oil separator 41 and an oil bypass pipe 42 are respectively disposed in the outlet-side refrigerant pipe (high pressure side) 2a and the inlet-side refrigerant pipe (low-pressure side) 2b of the compressor 2.

Reference oil surface level positions of the cases of the compressors 1 and 2 communicate with each other through an oil-equalizing pipe 43 to allow a lubricant to flow therebetween.

In addition, a high pressure switch 44 which is operated at a predetermined pressure and a pressure sensor 45 for sensing a change in pressure are mounted on a high pressure side refrigerant pipe 46 between the check valves 3 and 4, and the 4-way valve 5.

Figure 2:
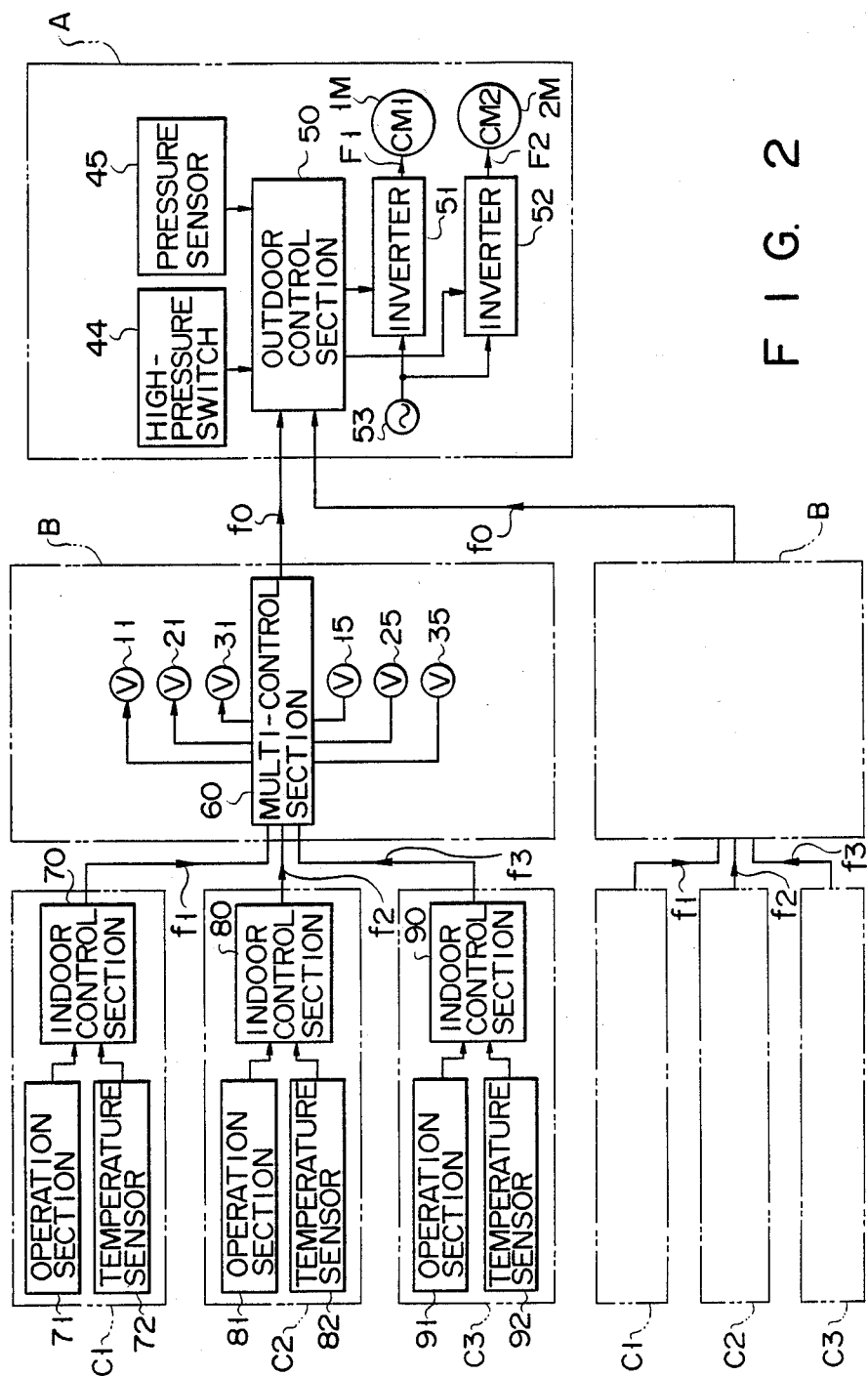
FIG. 2 is a block diagram showing an arrangement of a control circuit according to the first embodiment.

A control circuit is shown in FIG. 2.

The indoor unit A includes an outdoor control section 50. The outdoor control section 50 includes a microcomputer and its peripheral circuits, and is externally connected to inverters 51 and 52, the high pressure switch 44, and the pressure sensor 45.

The inverters 51 and 52 rectify the voltage of an AC power supply 53. The rectified voltage is converted into an AC voltage having a predetermined frequency by switching in response to a command from the outdoor control section 50, and supplied to compressor motors 1M and 2M as driving power.

The branch unit B includes a multi-control section 60. The multi-control section 60 includes a microcomputer and its peripheral circuits, and is externally connected to the refrigerant flow control valves 11, 21, and 31, and the opening/closing valves 15, 25, and 35. A detailed description of the multi-control section 60 disclosed in USP No. 4,720,982 assigned to the present assignee is incorporated in the present invention.

The indoor units $C_1$, $C_2$, and $C_3$ respectively include indoor control sections 70, 80, and 90. Each indoor control section is constituted by a microcomputer and its peripheral circuits. The indoor control sections are externally connected to operation sections 71, 81, and 91, and indoor temperature sensors 72, 82, and 92, respectively.

Figure 3:
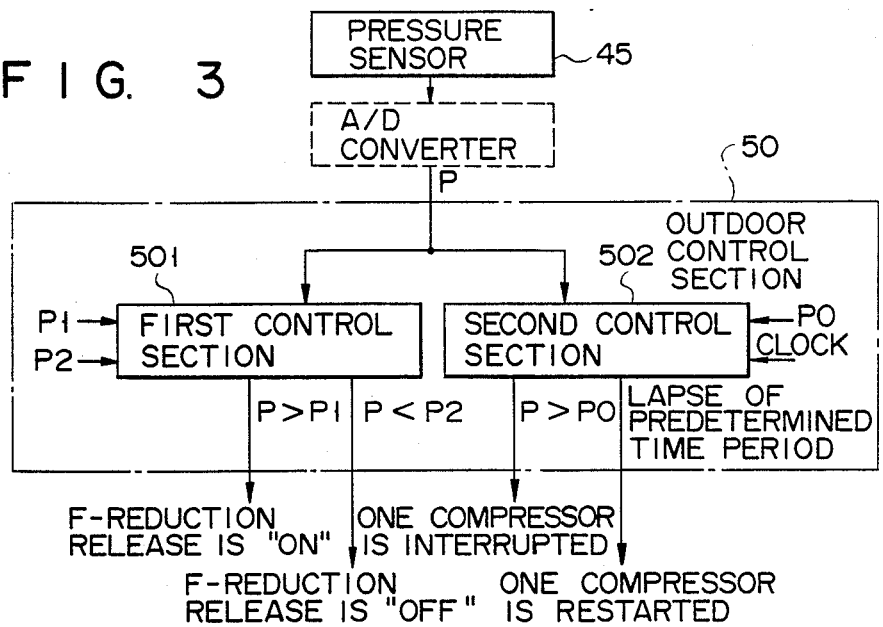
FIG. 3 is a block diagram showing an outdoor control section in detail according to the first embodiment.

As shown in FIG. 3, the outdoor control section 50 includes first and second control sections 501 and 502. When a sensed pressure P supplied as needed from the pressure sensor 45 through an A/D converter 45A exceeds a preset value $P_1$ (FIG. 4), the first control section 501 reduces operating frequencies $F_1$ and $F_2$ of the compressors 1 and 2. When the sensed pressure P of the pressure sensor 45 exceeds a preset value $P_0$ ($>P_1$) (FIG. 4), the second control section 502 interrupts one of the compressors 1 and 2.

An operation in the above-mentioned arrangement will be described below with reference to a graph showing pressure setting characteristics in FIG. 4 and a flow chart in FIG. 5.

Assume that a cooling operation is performed by all the indoor units.

In this state, the indoor control section 70 of the indoor unit $C_1$ calculates a difference between a sensed temperature of the indoor temperature sensor 72 and a preset temperature set by the operation section 71, and supplies a frequency setting signal $f_1$ corresponding to the difference in temperatures to the multi-control section 60 as a required cooling capability.

Similarly, the indoor control sections 80 and 90 of the indoor units $C_2$ and $C_3$ supply frequency setting signals $f_2$ and $f_3$ to the multi-control section 60 as required cooling capabilities, respectively.

The multi-control section 60 calculates a total required cooling capability of the indoor units based on the input frequency setting signals, and supplies a frequency setting signal $f_0$ corresponding to the sum of the capabilities to the outdoor control section 50.

The outdoor control section 50 controls the number of operating compressors, and operating frequencies (output frequencies of the inverters 51 and 52) of the compressors 1 and 2 based on the frequency setting signal $f_0$.

In this case, as the sum of the required cooling capabilities is increased, the outdoor control section 50 shifts the compressors 1 and 2 from a state wherein only one compressor 1 is operated to a state wherein both the compressors 1 and 2 are operated.

Note that the multi-control section 60 controls the openings of the flow control valves 11, 21, and 31 in accordance with the required cooling capabilities of the indoor units $C_1$, $C_2$, and $C_3$, respectively, and controls the amounts of refrigerant flowing to the indoor heat exchangers 14, 24, and 34 to keep the degree of superheat of the refrigerant at a predetermined value.

Upon operation, the outdoor control section 50 monitors the sensed pressure (high pressure P) of the pressure sensor 45. When the sensed pressure P exceeds the preset value $P_1$ (e.g., 25.5 Kg/cm$^2$), the first control section 501 supplies a command to the inverters 51 and 52 to reduce operating frequencies $F_1$ and $F_2$ of the compressors 1 and 2 at a rate of 0.5 sec/Hz (steps S1 and S2 in FIG. 5, and the steps to be described below are shown in FIG. 5). That is, a frequency-reduction release is performed.

When the sensed pressure P is decreased to fall within the normal range, i.e., to the preset value $P_2$ or less ($P_2 < P_1$) (FIG. 4), by the frequency-reduction release, the first control section 501 cancels the frequency-reduction release mode, and supplies a command to the inverters 51 and 52 to allow a gradual increase in operating frequencies $F_1$ and $F_2$ at a rate of, e.g., 8.0 sec/Hz (steps S3 and S4). At this time, if the sensed pressure P exceeds the preset value $P_2$ (e.g., 24.0 Kg/cm$^2$), the first control section 501 supplies a command to the inverters 51 and 52 to interrupt the increase in operating frequencies $F_1$ and $F_2$.

When the increase in higher-side pressure of the refrigeration cycle continues despite of the frequency-reduction release, and the sensed pressure P exceeds the preset value $P_0$ (e.g., 27.0 Kg/cm$^2$), the first control section 501 continues the frequency-reduction release for one compressor 1, and, at the same time, the second control section 502 supplies a command to the inverter 52 to interrupt an operation of the other compressor 2 for a predetermined time period (steps S5 to S7). The second control section 502 supplies a command to the inverter 52 to restart an operation of the compressor 2 after a predetermined time period has elapsed (step S8).

Figure 4:
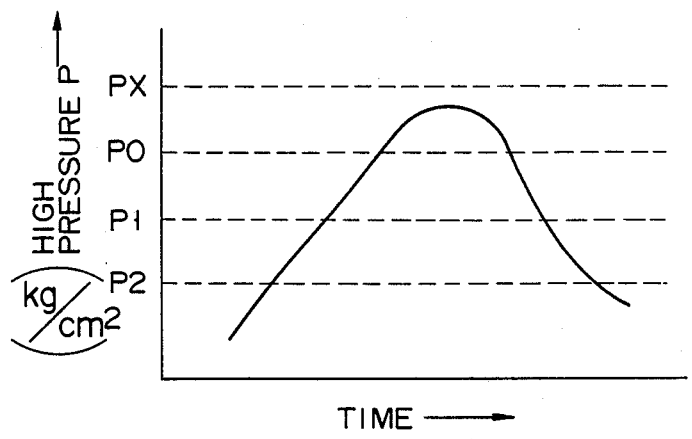
FIG. 4 is a graph showing a relationship between a higher-side pressure and a preset value according to the first embodiment.
Figure 5:
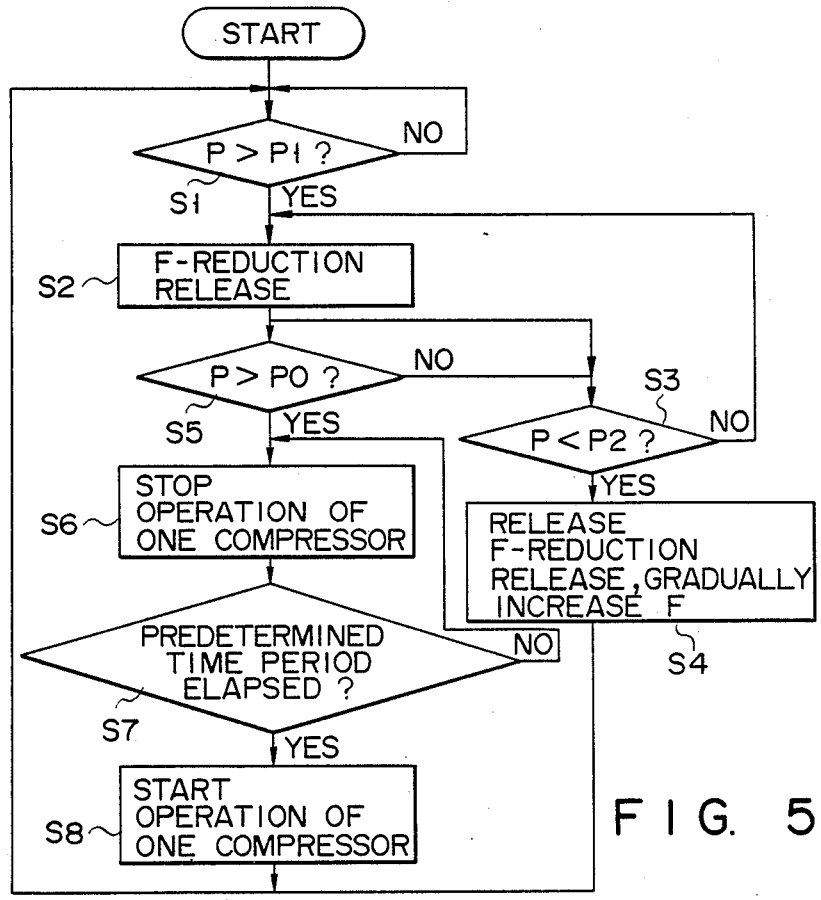
FIG. 5 is a flow chart for explaining an operation of the first embodiment.

Note that reference symbol $P_x$ in FIG. 4 denotes an operating point of the high pressure switch 44, and serves as an operating point of complete interruption of the air conditioner system, i.e., final protection.

Thus, when the higher-side pressure of the refrigeration cycle exceeds the preset value $P_1$, first, the frequency-reduction release of the operating frequencies $F_1$ and $F_2$ is performed. If an increase in higher-side pressure continues despite of the frequency-reduction release, an operation of the compressor 2 is interrupted at the preset value $P_0$, so that an abnormal increase in higher-side pressure of the refrigeration cycle can be suppressed with high reliability. Therefore, complete interruption by a operation of the high pressure switch 44 can be prevented, thus realizing a safe operation.

Figure 6:
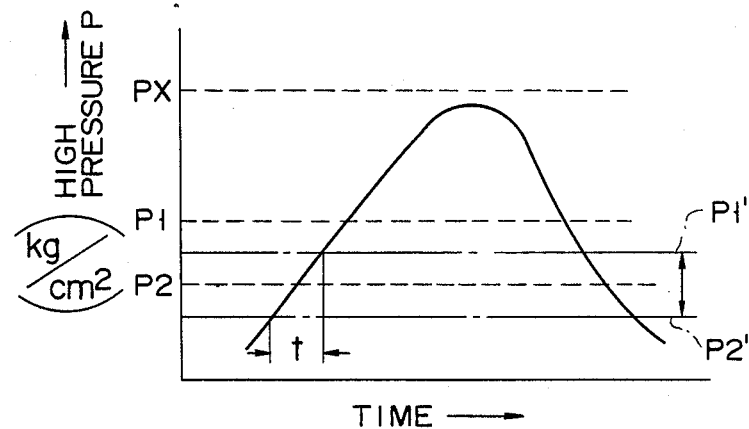
FIG. 6 is a graph showing a relationship between a higher-side pressure and a preset value according to a second embodiment of the present invention.

Note that, in the above embodiment, frequency-reduction release control for reducing an operating frequency and control for interrupting an operation of one compressor are sequentially executed in accordance with an increase in higher-side pressure of the refrigeration cycle. However, as shown in a graph of pressure setting characteristics in FIG. 6 and a flow chart in FIG. 7, control for suppressing an increase in higher-side pressure may be selectively executed in accordance with a rate of increase (time t) in higher-side pressure of the refrigeration cycle.

Figure 8:
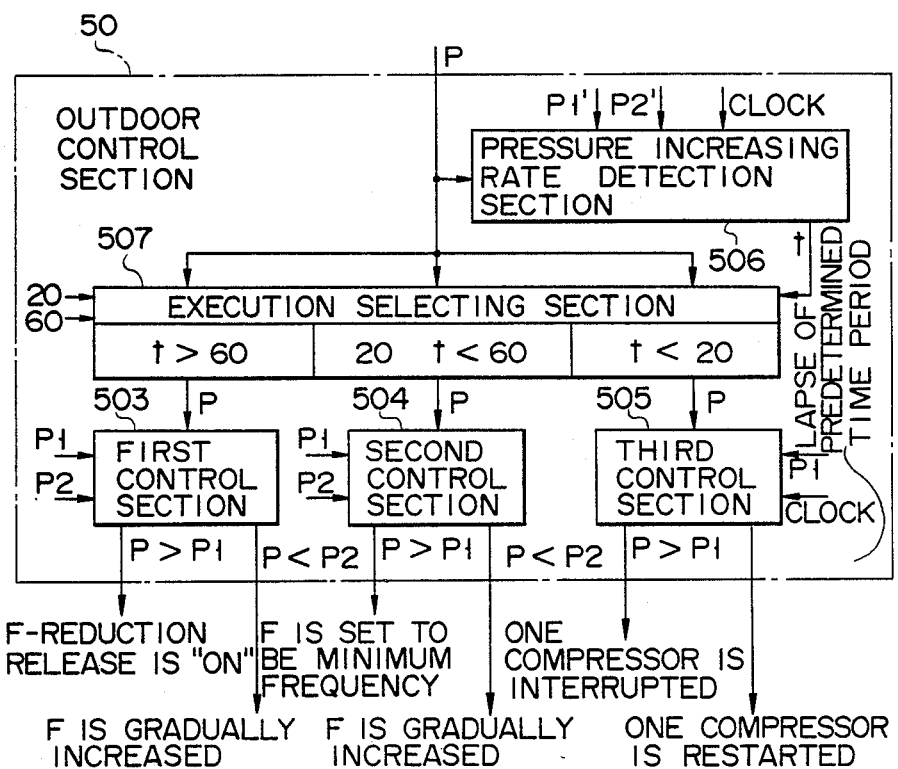
FIG. 8 is a block diagram showing an outdoor control section in detail according to the second embodiment.

In this case, as shown in FIG. 8, the outdoor control section 50 includes a first control section 503, a second control section 504, and a third control section 505. When the sensed pressure P of the pressure sensor 45 exceeds the preset value $P_1$, the first control section 503 reduces the operating frequencies $F_1$ and $F_2$ of the compressors 1 and 2. When the sensed pressure P of the pressure sensor 45 exceeds the preset value $P_1$, the second control section 504 immediately reduces the operating frequencies $F_1$ and $F_2$ of the compressors 1 and 2 to the minimum operating frequency $F_{min}$. When the sensed pressure P of the pressure sensor 45 exceeds the preset value $P_1$, the third control section 505 interrupts an operation of one of the compressors 1 and 2. The outdoor control section 50 also includes a pressure increasing rate detection section 506 for detecting an increasing rate of the sensed pressure P of the pressure sensor 45, and an execution selecting section 506 for selecting execution of the above-mentioned control sections.

Figure 7:
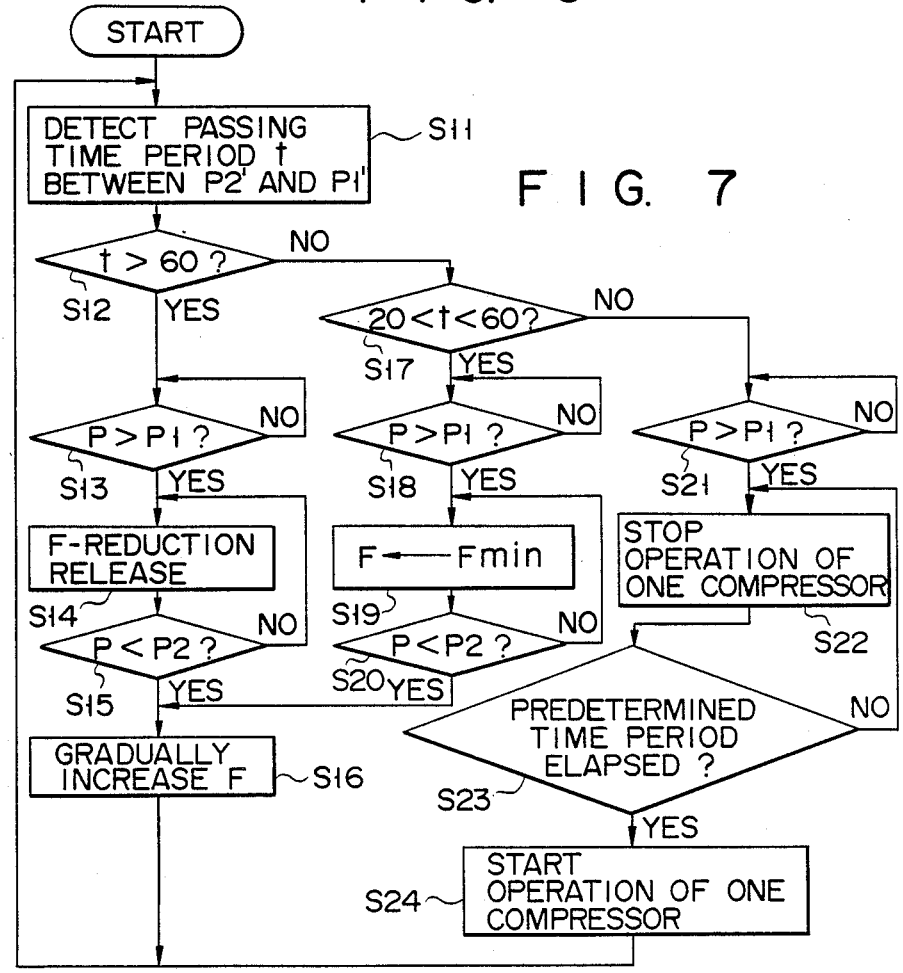
FIG. 7 is a flow chart for explaining an operation of the second embodiment.

More specifically, in the pressure increasing rate detection section 506, preset values $P_2'$ and $P_1'$ are set so that the preset value $P_2$ which is smaller than the preset value $P_1$ falls therebetween. The pressure increasing rate detection section 506 detects time t required until the sensed pressure P from the pressure sensor 45 is increased to exceed the preset values $P_2'$ and $P_1'$ in response to a timer signal CLOCK (step S11 in FIG. 7, and the steps to be described below are shown in FIG. 7).

When the detection time t is 60 sec. or more, i.e., when an increasing rate is low, the execution selecting section 507 selects the first control section 503. After the sensed pressure P exceeds the preset value $P_1$, the first control section 503 supplies a command to the inverters 51 and 52 to reduce both the operating frequencies $F_1$ and $F_2$ of the compressors 1 and 2 at a rate of 0.5 sec/Hz (steps S12 to S14).

When the sensed pressure P is decreased to fall within the normal range, i.e., to the preset value $P_2$ or less by the frequency-reduction release, the first control section 503 cancels the reduction release mode, and supplies a command to the inverters 51 and 52 to allow an increase in operating frequencies $F_1$ and $F_2$ (steps S15 and S16).

When the detection time t falls within the range of 20 sec. to 60 sec., i.e., when a rate of increase is intermediate, the execution selecting section 507 selects the second control section 504. After the sensed pressure P exceeds the preset value $P_1$, the second control section 504 immediately supplies a command to the inverters 51 and 52 to reduce the operating frequencies $F_1$ and $F_2$ of the compressors 1 and 2 to the minimum operating frequency $F_{min}$ (steps S17 to S19).

When the sensed pressure P is decreased to fall within the normal range, i.e., to the preset value $P_2$ or less by the frequency-reduction release, the second control section 504 supplies a command to the inverters 51 and 52 to cancel the frequency-reduction release mode and to allow the increase in operating frequencies $F_1$ and $F_2$ (steps S20 and S16).

When the detection time t is 20 sec. or less, i.e., when a rate of increase is high, the execution selecting section 507 selects the third control section 505. After the sensed pressure P exceeds the preset value $P_1$, the third control section 505 supplies a command to the inverter 52 to interrupt an operation of the compressor 2 for a predetermined time period (steps S21 to S23). After a predetermined time period has elapsed, the third control section 505 supplies a command to the inverter 52 to restart an operation of the compressor 2 (step S24).

Thus, a control mode is selected in accordance with a rate of increase in higher-side pressure of the refrigeration cycle, so that inconvenience, e.g., that the higher-side pressure of the refrigeration cycle is extremely decreased, or, on the contrary, that suppression is delayed, does not occur, thus suppressing an abnormal increase in higher-side pressure of the refrigeration cycle without failure.

Note that, although only operation in a cooling mode has been described in the above embodiment, the same effect can be obtained for an increase in higher-side pressure of the refrigeration cycle for a heating operation.

Although the rate of increase in higher-side pressure of the refrigeration cycle is detected between the preset values $P_2'$ and $P_1'$, the range of which includes the preset value $P_2$, the detection range of the preset values $P_2'$ to $P_1'$ is not limited thereto. For example, the preset values $P_2'$ and $P_1'$ can be set between the preset values $P_2$ and $P_1$.

The present invention is not limited to the above embodiment, and various changes and modifications may be made without departing from the spirit and scope of the invention.

As has been described above, the air conditioner system according to the first embodiment of the present invention includes a means for sensing a higher-side pressure of the refrigeration cycle, a control means for reducing an operating frequency of each compressor when the sensed pressure exceeds the preset value $P_1$, and a control means for interrupting an operation of one of the compressors when the sensed pressure exceeds the preset value $P_0$ ($>P_1$). Therefore, this air conditioner system can suppress an abnormal increase in higher-side pressure of the refrigeration cycle without failure, so that complete interruption by an operation of the high pressure switch can be prevented, thus realizing a stable operation.

An air conditioner system according to a second embodiment of the present invention includes a means for sensing a higher-side pressure of a refrigeration cycle, a control means for reducing an operating frequency of each compressor when the sensed pressure exceeds a preset value, a control means for interrupting an operation of one of the compressors when the sensed pressure exceeds the preset value, a means for detecting a rate of increase in sensed pressure, and a means for selecting execution of each control means in accordance with the sensed rate. Therefore, according to this air conditioner system, an abnormal increase in higher-side pressure of the refrigeration cycle can further be effectively suppressed, so that complete interruption by an operation of a high pressure switch can be prevented, thus realizing a stable operation.

What is claimed is:

1. An air conditioner comprising:
   an outdoor unit including at least two compressors, at least one which is a variable capacity compressor;
   an outdoor heat exchanger coupled with said outdoor unit;
   a plurality of indoor units coupled to said outdoor unit forming a refrigeration cycle therewith, each indoor unit having at least one indoor heat exchanger, and means for outputting required capability data in accordance with an air conditioner load of said indoor heat exchanger;
   pressure sensing means for sensing a pressure on the high pressure side of said refrigeration cycle; and
   control means for generating an operation command for designating a predetermined number of said compressors in operation and a predetermined capability of said variable-capability compressor in accordance with the required capability data from said plurality of indoor units and generating, in response to a detection output from said pressure sensing means, a correction command to correct the number of said compressors in operation and the capability of said variable-capability compressor, in order to prevent an abnormal increase in the pressure on the high pressure side of said refrigeration cycle, comprising:
   a first control section for generating a first command for reducing the capability of said variable-capability compressor in a predetermined step when the higher-side pressure of said refrigeration cycle exceeds a first preset value;
   a second control section for generating a second command for interrupting the operation of one of said two compressors when the pressure on the high pressure side exceeds the first preset value and then a second preset value after the first command is generated; and
   a third control section for generating a third command, after a predetermined time period has elapsed from generation of the second command, to restart one of said compressors which is in an operation-interruption state.

2. An air conditioner according to claim 1, wherein said first control section includes means for generating, after the first command is generated, a fourth command, for disabling the first command when the higher-side pressure is set below a third preset value, which value is smaller than the first preset value.

3. An air conditioner unit comprising:

an outdoor unit including at least two compressors at least one of which is a variable-capability compressor;

an outdoor heat exchanger coupled with said outdoor unit;

a plurality of indoor units coupled to said outdoor unit forming a refrigeration cycle therewith, each indoor unit having at least an indoor heat exchanger and means for outputting required-capability data in accordance with an air-conditioning load of said indoor heat exchanger;

pressure sensing means for sensing a pressure on the high pressure side of said refrigeration and outputting a detection output; and control means for generating an operation command for designating a predetermined number of said compressors in operation and a predetermined capability of said variable-capability compressor in accordance with the required-capability data from said plurality of indoor units and generating, in response to said detection output from said pressure sensing means, a correction command to correct the number said compressors in operation and the capability of said variable-capability compressor, in order to prevent an abnormal increase in the higher-side pressure of said refrigeration cycle, said control means comprising;

a pressure increasing rate detection section for detecting the rate of increase in higher-side pressure of said refrigeration cycle and outputting a rate detection value signal;

a first control section for generating a first command to reduce the capability of said variable-capability compressor in a predetermined step when the higher-side pressure of said refrigeration cycle exceeds a first preset value;

a second control section for generating a second command to interrupt an operation of one of said compressors when the higher-side pressure exceeds the first preset value;

an execution selecting section for selecting execution of said first control section when a detection value from said pressure increasing rate detection section is larger than a value corresponding to a first preset rate and for selecting execution of said second control section when the detection value is smaller that a value corresponding to a second preset rate which is lower that the first preset rate.

4. An air conditioner according to claim 3, wherein said second control section includes means for generating a third command to restart one of said two compressors which is in an operation interruption state after a predetermined time period has elapsed from generation of the second command.

5. An air conditioner according to claim 3, wherein said first control section includes means for generating a third command to disable the first command when the higher-side pressure is set to be lower than the second preset value which is smaller than the first preset value after the first command is generated.

6. An air conditioner according to claim 3, wherein said control means includes, in order to generate the correction command, a third control section for generating a third command for setting the capability of said variable-capability compressor to be a minimum value when the higher-side pressure of the refrigeration cycle exceeds the first preset value, and said execution selecting section includes means for selecting execution of said third control section when the detection value from said pressure increasing rate detection section falls within a range of the first and second preset rates.

7. An air conditioner according to claim 6, wherein said third control section includes means for generating a fourth command to disable the first command when the higher-side pressure is set to be the second preset value which is smaller than the first preset value after the third command is generated.

8. An air conditioner according to claim 7, wherein said third control section includes means for generating the fourth command and a fifth command to gradually increase the capability of said two variable-capability compressors from the minimum value.

9. An air conditioner comprising:

an outdoor unit including at least two inverters for respectively supplying driving outputs having predetermined operating frequencies, two compressor motors driven at variable rates in accordance with reception of the driving outputs from said two inverters, two variable-capability compressors respectively coupled to said two compressor motors, and an outdoor heat exchanger coupled to said two variable-capability compressors, said two variable-capability compressors including lubricant supply section coupled to each other through an oil-equalizing member;

a plurality of indoor units coupled to said outdoor unit to constitute a refrigeration cycle, each indoor unit having at least an indoor heat exchanger, and means for outputting a frequency setting signal as required capability data in accordance with an air-conditioning load of said indoor heat exchanger;

pressure sensing means for sensing a higher-side pressure of said refrigeration cycle and outputting an output signal; and control means for generating an operation command for designating a predetermined number of operating compressors and a predetermined operating frequency of said two variable-capability compressors of said outdoor unit in accordance with the required capability data from said plurality of indoor units, and generating a correction command to correct the number of operating compressors and the operating frequency of said two variable-capability compressors in order to prevent an abnormal increase in higher-side pressure of said refrigeration cycle in response to an output signal from said pressure sensing means, said control means comprising;

a first control section for generating a first command to reduce the operating frequencies of said two variable-capability compressors in a predetermined step when the higher-side pressure of said refrigeration cycle exceeds a first preset value, and;

a second control section for generating a second command to interrupt an operation of one of said two variable-capability compressors when the higher-side pressure exceeds the first preset value and then a second preset value after the first command is generated.

10. An air conditioner according to claim 4, wherein said second control section includes means for generating a third command to restart one of said variable-capability compressors which is in an operation interruption state after a predetermined time period has elapsed from generation of the second command.

11. An air conditioner according to claim 4, wherein said first control section includes means for generating a fourth command to disable the first command when the higher-side pressure is set to be below a third preset value which is smaller than the first preset value after the first command is generated.

12. An air conditioner according to claim 4, wherein said control means includes, in order to generate the correction command, a pressure increasing rate detection section for detecting a rate of increase in higher-side pressure of said refrigeration cycle, a first control section for generating a first command to reduce the operating frequencies of said two variable-capability compressors in a predetermined step when the higher-side pressure of said refrigeration cycle exceeds a first preset value, a second control section for generating a second command to interrupt an operation of one of said two variable-capability compressors when the higher-side pressure exceeds the first preset value, and an execution selecting section for selecting execution of said first control section when a detection value from said pressure increasing rate detection section is larger than a value corresponding to first preset rate, and for selecting execution of said second control section when the detection value is smaller than a value corresponding to a second preset rate which is lower than the first preset rate.

13. An air conditioner according to claim 12, wherein said second control section includes means for generating a third command to restart one of said variable-capability compressors which is in an operation interruption state after a predetermined time period has elapsed from generation of the second command.

14. An air conditioner according to claim 12, wherein said control means includes, in order to generate the correction command, a third control section for generating a third command for setting the operating frequencies of said two variable-capability compressors to be a minimum value when the higher-side pressure of the refrigeration cycle exceeds the first preset value, and said execution selecting section includes means for selecting execution of said third control section when the detection value from said pressure increasing rate detection section falls within a range of the first and second preset rates.

15. An air conditioner according to claim 14, wherein said third control section includes means for generating a fourth command to disable the first command when the higher-side pressure is set to be the second preset value which is smaller than the first preset value after the third command is generated.

16. An air conditioner according to claim 15, wherein said third control section includes means for generating the fourth command and a fifth command to gradually increase the operating frequencies of said two variable-capability compressors from the minimum value.

17. An air conditioner according to claim 4, wherein said first control section includes means for generating a third command to disable the first command when the higher-side pressure is set to be lower than the second preset value which is smaller than the first preset value after the first command is generated.

18. An air conditioner according to claim 4, wherein said means for outputting the required capability data in each of said plurality of indoor units includes means for detecting an air-conditioning load of said indoor heat exchanger.

19. An air conditioner according to claim 18, wherein each of said detecting means comprises an operation section for setting an indoor temperature, a temperature sensor for sensing the indoor temperature, and an indoor control section for calculating a difference between a preset temperature by said operation section and a sensed temperature by said temperature sensor, and outputting the required capability data corresponding to the difference in temperature.

20. An air conditioner according to claim 4, wherein said air conditioner further comprises a distribution unit for allowing parallel coupling between said outdoor unit and said plurality of indoor units to constitute each refrigerant cycle, said distribution unit including a plurality of refrigerant flow control means for each refrigeration cycle.

21. An air conditioner according to claim 20, wherein said air conditioner further comprises second control means for supplying a control command corresponding to the required capability data from each of said plurality of indoor units to a corresponding one of said refrigerant flow control means in said distribution unit, and outputting a frequency setting signal corresponding to sum data of the required capability data.

22. An air conditioner according to claim 21, wherein said distribution unit further comprises parallel sections respectively including a plurality of cooling expansion valves and a plurality of heating cycle formation check valves, and a plurality of gas-side opening/closing valves.

23. An air conditioner according to claim 21, wherein said second control means serves as a multi-control section in said distribution unit.

24. An air conditioner according to claim 4, wherein said two variable-capability compressors are coupled to their refrigerant outlet sides in parallel to each other through check valves, respectively.

25. An air conditioner according to claim 24, wherein said outdoor unit further comprises an oil separator disposed between each refrigerant outlet side of corresponding one of said two variable-capability compressors and each check valve, and an oil bypass means extending from said oil separator to each refrigerant inlet side of corresponding one of said two variable-capability compressors.

26. An air conditioner according to claim 4, wherein said outdoor unit further comprises a parallel section having a four-way valve, a heating expansion valve, and a cooling cycle formation check valve, a liquid tank, and an accumulator.

27. An air conditioner according to claim 4, wherein said oil-equalizing member of said outdoor unit comprises an oil-equalizing pipe for allowing reference oil surface level positions of said two variable-capability compressors to communicate with each other.

28. An air conditioner according to claim 4, wherein said control means serves as an outdoor control section in said outdoor unit.

29. An air conditioner according to claim 28, wherein said outdoor control section comprises a microcomputer and its peripheral circuits, and is connected to said two compressor motors through said two inverters.

* * * * *